July 18, 1944.  J. GARST  2,354,112
HARVESTER
Filed June 30, 1941  4 Sheets-Sheet 1
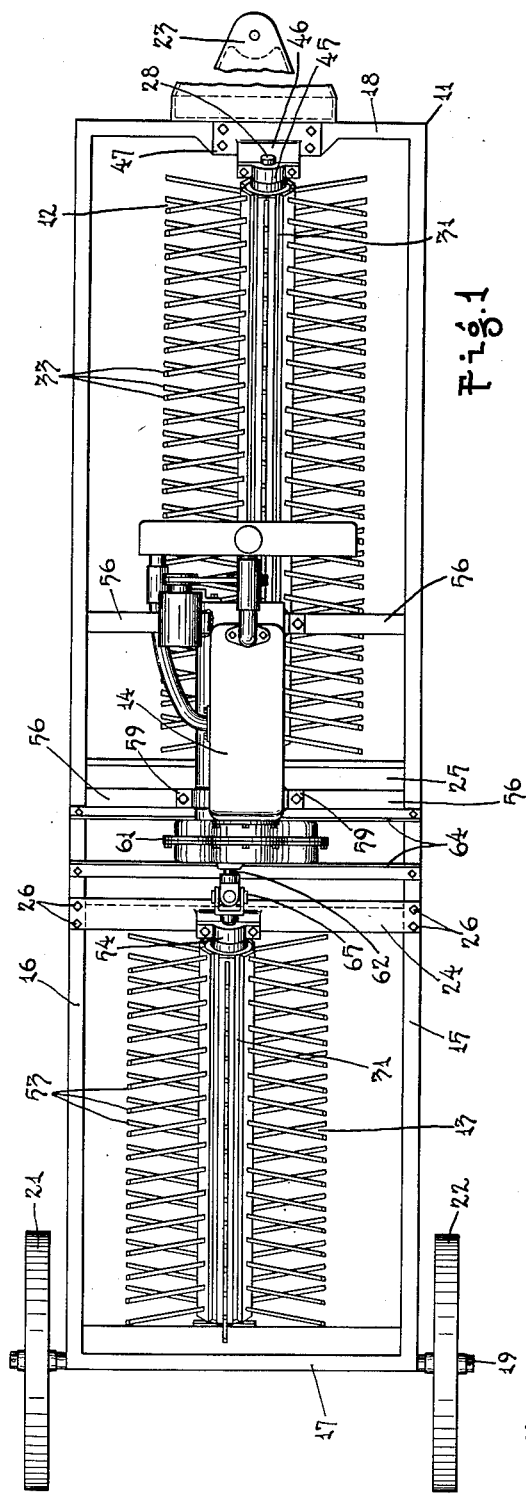
Inventor
Jonathan Garst
By Caswell & Lagaard
Attorneys

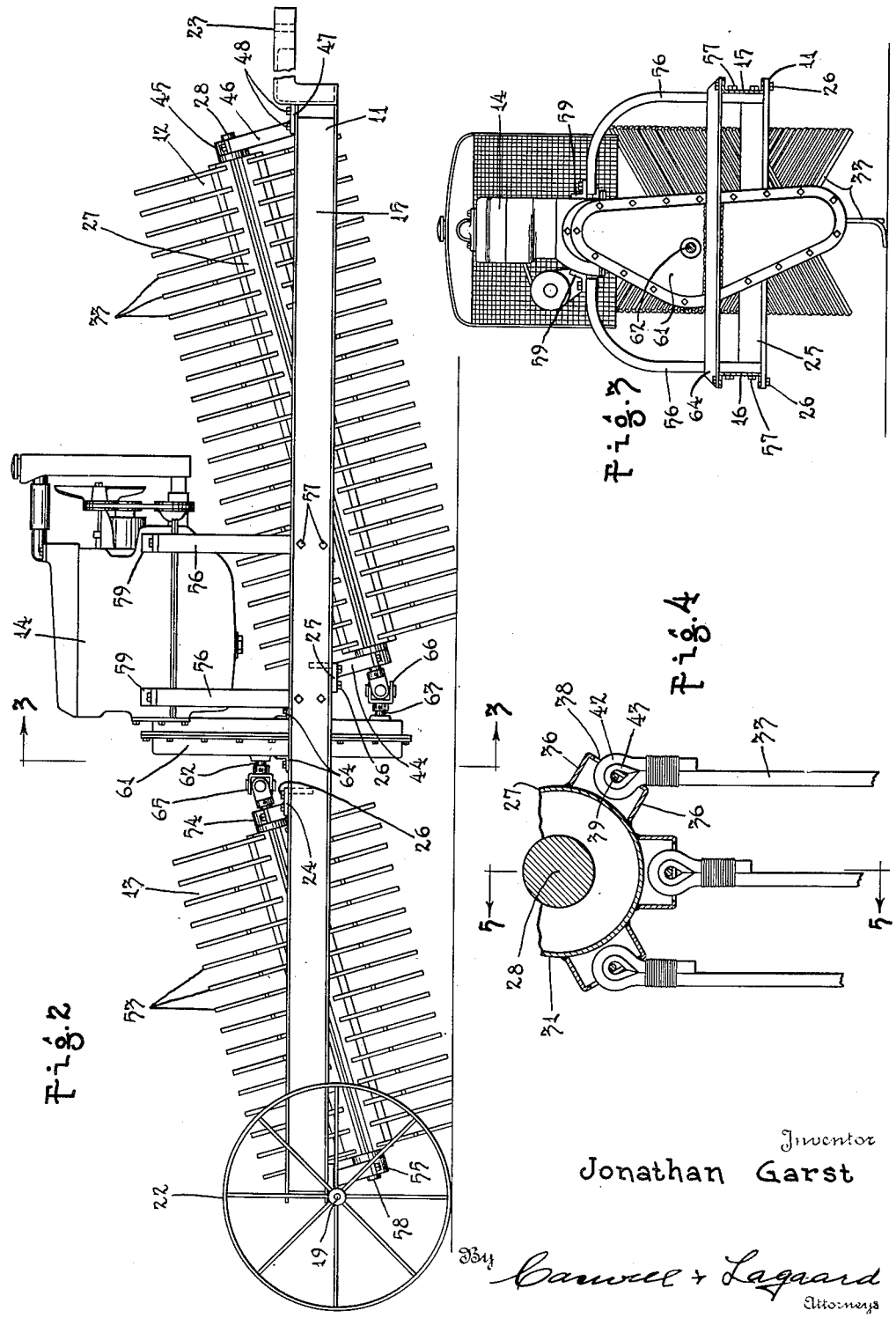

July 18, 1944.                     J. GARST                      2,354,112
                                  HARVESTER
                            Filed June 30, 1941              4 Sheets-Sheet 3

Inventor
Jonathan Garst

By Caswell & Lagaard
                Attorneys

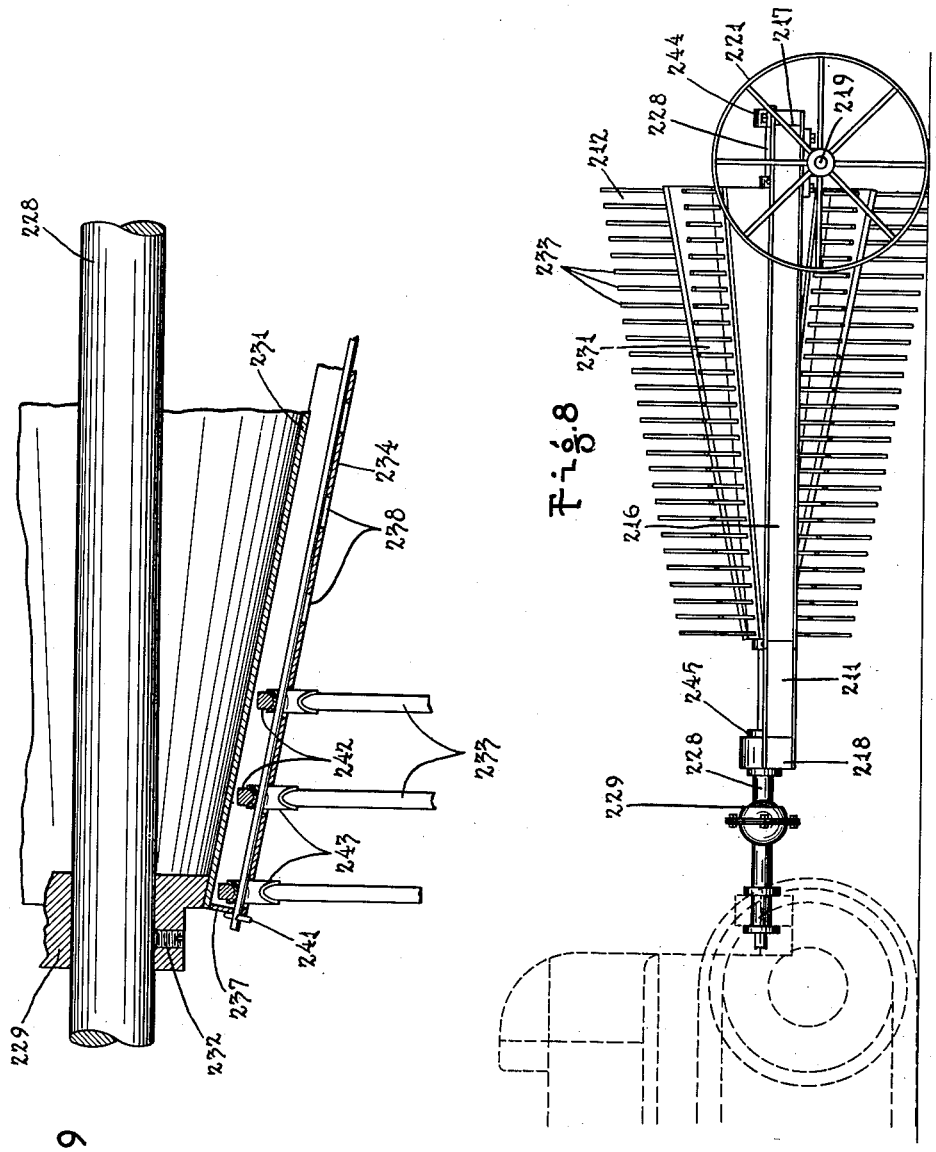

Patented July 18, 1944

2,354,112

UNITED STATES PATENT OFFICE 2,354,112

HARVESTER

Jonathan Garst, Palo Alto, Calif.

Application June 30, 1941, Serial No. 400,434

9 Claims. (Cl. 56—249)

My invention relates to harvesters and particularly to harvesters of the nature disclosed in Patent No. 2,250,948, issued to me July 29, 1941, by means of which the tops or appendages of beets or other vegetation may be removed without injury to the roots or body portions of the plants.

An object of the invention resides in providing a harvester by means of which the tops or appendages are effectively and postively removed.

Another object of the invention resides in providing one or more toppers, each constructed with a revoluble member having whip lashes projecting outwardly therefrom and in constructing the whip lashes of sufficient resiliency to effectively remove the tops or appendages of the plants without injury to the roots or body portions thereof.

Another object of the invention resides in providing a harvester with two toppers arranged to engage the plants from opposite sides thereof.

A still further object of the invention resides in providing a harvester in which the whip lashes are of the same length.

An object of the invention resides in arranging the revoluble members carrying the whip lashes with their axes laterally spaced from one another and disposed one on each side of the center of the row of plants and extending in the same direction as the row.

A feature of one form of the invention resides in arranging the revoluble members abreast.

A feature of another form of the invention resides in arranging the revoluble members in tandem.

Another object of the invention resides in the construction for supporting the revoluble members and in the details of construction of the various parts and the arrangement of the parts with reference to one another.

In the drawings:

Fig. 1 is a plan view of a harvester illustrating an embodiment of my invention.

Fig. 2 is an elevational view of the structure shown in Fig. 1.

Fig. 3 is a cross-sectional, elevational view taken on line 3—3 of Fig. 2.

Fig. 4 is a fragmentary, cross-sectional view through one of the toppers of the invention.

Fig. 5 is a longitudinal, fragmentary, elevational detail view taken on line 5—5 of Fig. 4.

Fig. 8 is an elevational view of still another form of the invention.

Fig. 9 is a longitudinal, elevational, sectional view taken through one of the toppers of the device shown in Fig. 8.

Figure 6:
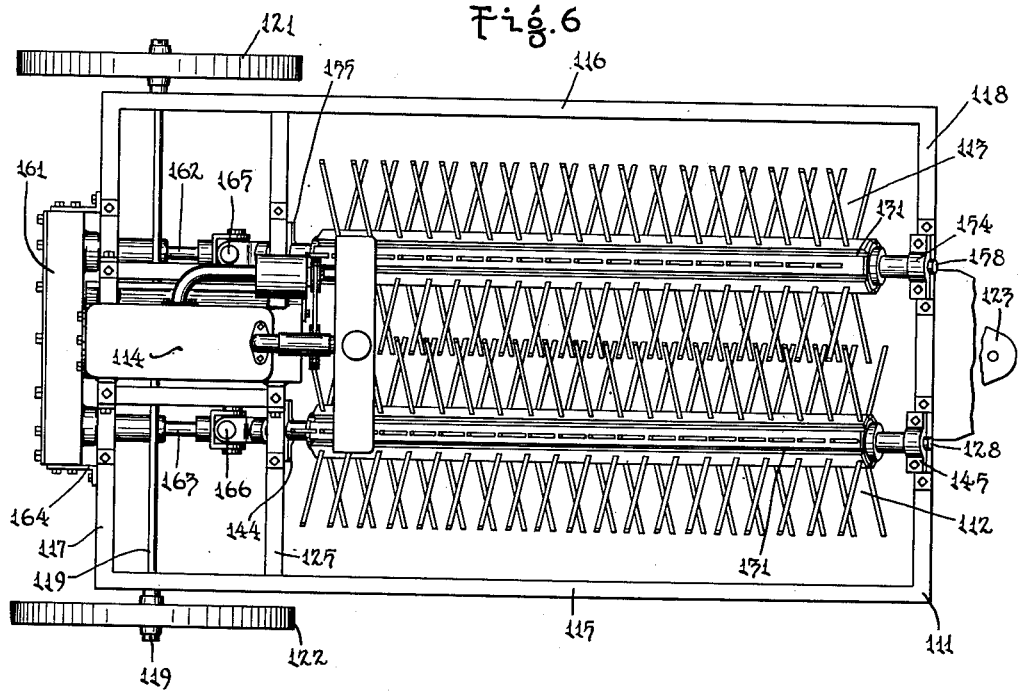
Fig. 6 is a plan view of a modification of the invention.

In Figs. 1 to 5, I have illustrated a form of the invention which comprises a wheel-supported fram 11 having mounted thereon two toppers 12 and 13 which are arranged in tandem and which are driven by a motor 14 carried by the said frame. The frame 11 is adapted to be coupled to a tractor and is drawn by the tractor. A description of the various parts of the harvester shown in Figs. 1 to 5 follows.

The frame 11 comprises two longitudinally extending spaced frame members 15 and 16 which are connected together at their rearward and forward ends by means of two cross-frame members 17 and 18. These frame members may be secured together by welding or in any other suitable manner. At the rear of the frame, an axle 19 is provided which rotatably carries two supporting wheels 21 and 22. These wheels and the axle 19 may be of any suitable construction and form no particular feature of the invention. At the forward end of the frame 11 and attached to the cross frame member 18 is a hitch 23 which also may be of any suitable construction and which forms no particular feature of the invention. At the intermediate portion of the frame 11 are provided other cross frame members 24 and 25 which serve a purpose to be presently referred to. These frame members are secured to longitudinal frame members 15 and 16 by means of bolts 26.

The two toppers 12 and 13 are identical in construction, except for length and for this reason only the topper 12 will be described in detail. This topper comprises a revoluble member 27 which consists of a shaft 28 extending throughout the length thereof. The shaft 28 has mounted upon it two hubs 29 which carry a cylindrical drum 31. The hubs 29 may be secured to the shaft 28 by means of set screws 32 screwed therein. Issuing outwardly from the revoluble member 27 are a number of whip lashes 33 which engage the tops or other portions of the plants to be removed and flick the same off as the topper 12 rotates. These whip lashes are supported in the following manner. Welded to the drum 31 are a number of channel-shaped box-like supporting members 34 which have webs 35 and longitudinally extending flanges 36 which engage the said drum and are welded thereto. The said supporting members also have end walls 37 connected to the same. In the webs 35 are formed at regular spaced intervals openings 38 which extend partly across said webs, as best shown in Fig. 4. A pintle 39 is disposed within the interior of the supporting member 34 and passes through the end walls 37, being held in position relative thereto by means of cotter keys 41. The whip lashes 33 are formed with loops 42 which are looped about thimbles 43 threaded on the pintle 39. These thimbles pass through the openings 38 and restrain longitudinal movement of the whip lashes with reference to the supporting member 34. The pintles 39 serve to pivotally support the whip lashes so the same may move outwardly by centrifugal force with minimum flexure at their points of issuance from the revoluble member.

The revoluble member 12 is rotatably supported by means of two bearings 44 and 45. The bearing 44 is welded to the cross frame 25 and issues downwardly therefrom at an inclined angle. The bearing 45 has a leg 46 which issues upwardly from a base 47 and is arranged in inclined relation relative thereto. The base 47 is secured by means of bolts 48 to the cross frame member 18. The shaft 28, adjacent the hubs 32 is rotatably mounted in the bearings 44 and 45 and is so arranged that the tips of the whip lashes 33 thereof at the rear end of the topper engage the ground and at the forward end thereof are spaced above the ground.

The topper 13, as previously stated, is identical with the topper 12. The shaft 58 thereof is journaled in bearings 54 and 55. The bearing 55, similar to bearing 45, is attached to the cross frame member 17. The bearing 54 is secured to the cross frame 24. The topper 13 is also arranged so that the whip lashes 53 thereof engage the ground at the rearward end of the topper and so that the same are spaced from the ground at the forward end of the topper. The two toppers 12 and 13 are also arranged so that the axes thereof are laterally spaced from one another and are disposed on opposite sides of the center line of the frame 11 and the row of plants to be harvested.

For the purpose of driving the two toppers 12 and 13, the motor 14 is employed. This motor may be a suitable gasoline engine or any other suitable source of power may be used. The said motor is supported on four uprights 56 which are bolted to the longitudinal frame members 15 and 16 by means of bolts 57. These uprights are bent toward each other at their upper ends and are attached to lugs 59, which form part of the motor 14. Mounted in a suitable case 61 is a transmission which has not been shown in detail in the drawings. This transmission is operated from the crank shaft of the motor 14 and includes two counter shafts 62 and 63 which project outwardly therefrom on opposite sides of the case 61. The case 61 is supported by means of two cross frame members 64 which are welded to said case and bolted to the longitudinally extending frame members 15 and 16. A universal joint 65 between shaft 62 and shaft 58 drives the topper 13 in a clockwise direction, as viewed from the rear of the device. A universal joint 66 connected to the shaft 63 and to the shaft 28, drives the topper 12 in a counterclockwise direction, as viewed from the rear of the device. Thus the two revoluble members travel in opposite directions. I have found that satisfactory results are produced when the transmission in case 61 is so proportioned that the tips of the whip lashes travel at a speed of between 80 and 150 feet per minute.

In the use of my improved harvester, the same is drawn along a row of plants with the row centered between the wheels 21 and 22. This brings the topper 13 slightly to the left of the row and the topper 12 slightly to the right of the row. As the machine travels, the motor 14 causes rotation of the revoluble members of the two toppers and whip lashes 33 and 53 thereof are caused to engage the tops of the plants from the opposite sides thereof. When the harvester is used for topping beets, the said whip lashes progressively flick off the leaves and other portions of the plants above the roots and remove the entire tops without injury to the roots themselves.

The size and construction of the whip lashes 23 and 53 of the invention may vary in accordance with the different uses to which the harvester may be put. While the harvester has been particularly described and shown as capable for use for topping beets, it can be readily comprehended that the same may be used for harvesting the portions of other plants disposed above the ground, such as berries, seeds and leaves. Where the same is used for topping beets, I have found that whip lashes of square or rectangular shape constructed of rubber are suitable when constructed of lateral dimensions of between 1/4 inch and 1/2 inch and of a length such that the diameter of the surface of revolution of the tips of the whip lashes would be approximately 30 inches. Satisfactory results are also produced when the whip lashes are constructed from a soft flexible rubber having a hardness of between 48 units and 58 units measured by a Shore durometer.

Figure 7:
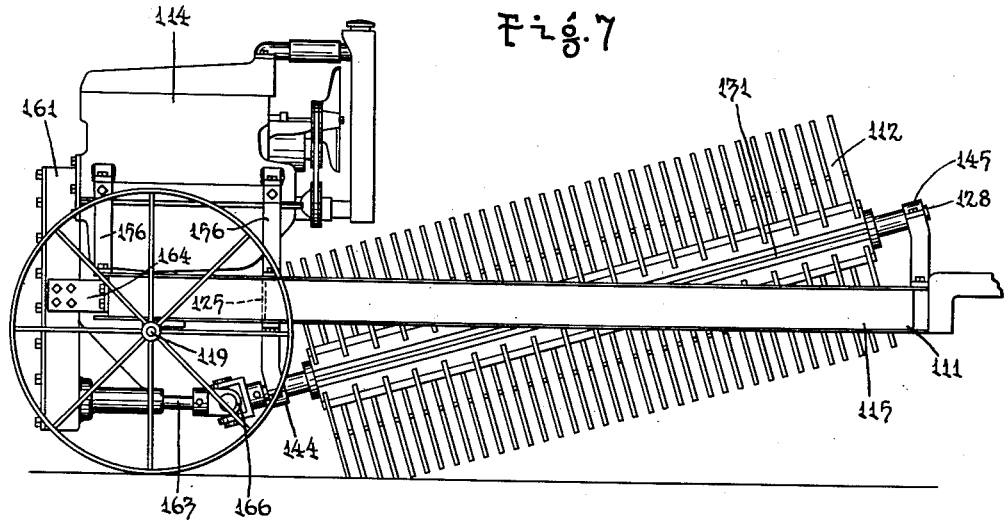
Fig. 7 is an elevational view of the structure shown in Fig. 6.

In Figs. 6 and 7, I have shown a modification of the invention in which the toppers are arranged abreast instead of in tandem as shown in Figs. 1 and 2. This form of the invention being similar to that previously described, a description of the corresponding parts will not be repeated and the same reference numerals preceded by the digit "1" will be used to refer to the corresponding parts. The frame 111 of this form of the invention is considerably wider than frame 11 and of less length. In this form of the invention, the bearings 145 and 154 for the forward ends of the toppers 112 and 113 are mounted on the cross frame member 118, while the rear bearings 144 and 155 are mounted on a single cross frame member 125, which is secured to the longitudinal frame members 115 and 116. The motor 114 is carried on braced legs 156 which are attached to the rear frame member 117 and also the cross frame member 125. In this case, the motor is mounted at the rear of the frame 111, being over the axle 119 and the transmission 161 is disposed rearwardly of the frame 111, being attached to the cross frame member 117 by means of brackets 164. The two shafts 128 and 158 are driven through universal joints 165 and 166 from shafts 162 and 163, both of which issue forwardly from the transmission case 161. These shafts are both driven in the proper direction, so that the two revoluble members rotate in opposite directions, the same as in the other form of the invention. It will be noted that the shafts 128 and 158 are spaced apart a distance sufficient to cause the whip lashes 133 and 153 thereof to travel through paths which intersect one another.

The form of the invention shown in Figs. 6 and 7 may be used in several different ways. If desired, the device may be run over a single row of plants, the plants being disposed medially between the axes of the two toppers. In such case, the whip lashes of the two toppers are arranged to mesh deeply so as to cause the whip lashes to effectively remove the tops of the plants in close proximity to the ground. Where the leaves of the plants do not directly issue from the roots but from a stem or stalk, the spacing of the two axes from one another may be greater. The device may also be used for topping two rows of plants and the axes of the toppers spaced apart the same distance as the distance between rows. Where the device is to be used with two rows, other toppers may be run in tandem with the two toppers illustrated as disclosed in Fig. 1 to engage the plants of both rows from opposite sides thereof.

In the construction shown in both of the forms of the invention disclosed in Figs. 1 to 7, the whip lashes are of the same length. At the same time, the axis of the toppers are arranged in inclined relation to procure progressive engagement of the whip lashes with the tops of the plants. The same results can be procured by the construction shown in Figs. 8 and 9, in which the axis is arranged horizontally. In the construction shown in these figures, certain of the parts are similar to those previously described and the description thereof will not be repeated. For the purpose of reference, the same reference numeral will be used as employed with the device shown in Figs. 1 and 2, which reference numeral will be preceded by the digit "2." In this form of the invention, the drum 231 is conical in form, instead of cylindrical, as with the other forms of the invention. Also, a single topper has been shown having a shaft 228 which is mounted for rotation in a front bearing 245 secured to the cross frame member 218 of frame 211 and in a rear bearing 244 secured to the corss frame member 217 of said frame. The frame 211, instead of being connected by a separate hitch to the tractor, is connected to it by means of a universal joint 229 similar to that used in motor vehicle construction, through which a drive for the topper is run.

The advantages of my invention are manifest. By the use of two toppers arranged as shown, the leaves and other portions of the plants to be harvested, are effectively removed. By means of this construction, injury to the roots is prevented and at the same time, the tops of the plants properly removed. By constructing the whip lashes of the same length, each whip lash has the same action and uniform results are readily produced. At the same time, only one item is needed for replacement.

Changes in the specific form of my invention, as herein disclosed, may be made within the scope of what is claimed without departing from the spirit of my invention.

Having described my invention, what I claim as new and desire to protect by Letters Patent is:

1. A harvester comprising a wheel supported frame adapted to travel along the ground lengthwise of a row of plants, a pair of revoluble members carried by said frame, each member consisting of an elongated core and a plurality of thin flexible normally limp whip lashes attached thereto and distributed about and along the same, such core extending generally fore and aft of the harvester, means for rotating the core about its axis at a speed sufficient to effect the radial extension of the whip lashes by centrifugal force, the tips of the radially extended lashes lying in a surface of revolution progressively approaching the ground rearwardly thereof at its underside, the disposition of the tips of the extended whip lashes being such as to effect the engagement thereof at progressively lower elevations with appendages of said plants for flicking-off the same, said revoluble members being relatively axially disposed to take positions, one at one side and one at the other side of the medial vertical plane of the row of plants and to present their whip lashes to the plants at opposite sides thereof.

2. A harvester comprising a wheel supported frame adapted to travel along the ground lengthwise of a row of plants, a revoluble member carried by said frame, said member consisting of an elongated core and a plurality of thin flexible normally limp whip lashes distributed about and along the core, said core having means for attaching the whip lashes thereto, the core extending generally fore and aft of the harvester, means for rotating the core about its axis at a speed sufficient to effect the radial extension of the whip lashes by centrifugal force, said means for attaching the whip lashes to the core being uniformly spaced from the axis thereof, the lengths of the whip lashes being substantially the same and such as to effect the engagement of tips of the extended lashes with appendages of said plants for flicking-off the same, said axis of said core being downwardly inclined rearwardly with respect to the direction of travel progressively to bring the tips of the whip lashes into engagement, at progressively lower elevations, with the plants encountered in the travel of the harvester.

3. A harvester comprising a wheel supported frame adapted to travel along the ground over plants therein, a revoluble member carried by said frame, said member consisting of an elongated core and a plurality of thin flexible normally limp whip lashes distributed about and along the core, said core having means for attaching the whip lashes thereto, means for rotating the core about its axis at a speed sufficient to effect the radial extension of the whip lashes by centrifugal force, the lengths of the whip lashes being such as to effect the engagement of tips of the extended lashes with appendages of said plants for flicking off the same, said whip lash attaching means including a plurality of channel members incorporated in the core structure and extending longitudinally thereof in circumferentially spaced relation about the same, the webs of the channel members being outermost and each thereof formed with a number of openings therein elongated transversely of such member and spaced apart longitudinally thereof, said attaching means also including fastening rods, one within each channel member extending therealong, said whip lashes being looped at their inner ends to form attaching eyes, a number of said looped lashes being strung on each of said fastening rods, there being one whip lash to each of said openings in each channel member, each such whip lash extending through its respective opening.

4. A harvester comprising a wheel supported frame adapted to travel along the ground lengthwise of a row of plants, a pair of revoluble members carried by said frame, said member consisting of an elongated core and a plurality of thin flexible normally limp whip lashes attached thereto and distributed about and along the same, such core extending generally fore and aft of the harvester, means for rotating the core about its axis at a speed sufficient to effect the radial extension of the whip lashes by centrifugal force, the tips of the radially extended lashes lying in a surface of revolution one side of which progressively approaches the plants rearwardly of the harvester, the disposition of the tips of the extended whip lashes being such as to effect their engagement progressively, in successively disposed parallel planes, with appendages of said plants for flicking off the same, said revoluble members being arranged in tandem and driven in opposite directions.

5. A harvester comprising a wheel supported frame adapted to travel along the ground lengthwise of a row of plants, a pair of revoluble members carried by said frame, each member consisting of an elongated core and a plurality of thin flexible normally limp whip lashes attached thereto and distributed about and along the same, such core extending generally fore and aft of the harvester, means for rotating the core about its axis at a speed sufficient to effect the radial extension of the whip lashes by centrifugal force, the tips of the radially extended lashes lying in a surface of revolution one side of which progressively approaches the plants rearwardly of the harvester, the disposition of the tips of the extended whip lashes being such as to effect their engagement progressively, in successively disposed parallel planes, with appendages of said plants for flicking off the same, said revoluble members being arranged abreast and driven in opposite directions, said surfaces of revolution of said members intersecting each other, the whip lashes of the respective members being relatively disposed to effect the free interdispositioning thereof when extended.

6. A harvester comprising a wheel supported frame adapted to travel along the ground lengthwise of a row of plants, a pair of revoluble members carried by said frame, each member consisting of an elongated core and a plurality of thin flexible normally limp whip lashes attached thereto and distributed about and along the same, such core extending generally fore and aft of the harvester, means for rotating the core about its axis at a speed sufficient to effect the radial extension of the whip lashes by centrifugal force, the tips of the radially extended lashes lying in a surface of revolution one side of which progressively approaches the plants rearwardly of the harvester, the disposition of the tips of the extended whip lashes being such as to effect their engagement progressively, in successively disposed parallel planes, with appendages of said plants for flicking off the same, said revoluble members being oppositely driven so that the whip lashes at the lower portion of one member travel away from the whip lashes at the lower portion of the other member.

7. A harvester comprising a wheel supported frame adapted to travel along the ground lengthwise of a row of plants, a plurality of revoluble members carried by said frame, each revoluble member consisting of an elongated core and a plurality of thin flexible normally limp whip lashes attached thereto and distributed about and along the same, such core extending generally fore and aft of the harvester, means for rotating the core about its axis at a speed sufficient to effect the radial extension of the whip lashes by centrifugal force, the tips of the radially extended lashes lying in a surface of revolution one side of which progressively approaches the plants rearwardly of the harvester, the disposition of the tips of the extended whip lashes being such as to effect their engagement progressively, in successively disposed parallel planes, with appendages of said plants for flicking-off the same, said revoluble members being relatively axially disposed to present their respective whip lashes to the plants, principally at localities containing different groupings of the appendages thereof.

8. A harvester comprising a wheel supported frame adapted to travel along the ground lengthwise of a row of plants, revoluble members carried by said frame, each member consisting of an elongated core and a plurality of thin flexible normally limp whip lashes attached thereto and distributed about and along the same, such core extending generally fore and aft of the harvester, means for rotating the core about its axis at a speed sufficient to effect the radial extension of the whip lashes by centrifugal force, the tips of the radially extended lashes lying in a surface of revolution one side of which progressively approaches the plants rearwardly of the harvester, the disposition of the tips of the extended whip lashes being such as to effect their engagement progressively, in successively disposed parallel planes, with appendages of said plants for flicking-off the same, one of said revoluble members being disposed in advance of the other.

9. A harvester comprising a wheel supported frame adapted to travel along the ground over plants therein, a revoluble member carried by said frame, said member consisting of an elongated core and a plurality of thin flexible normally limp whip lashes attached to the core and distributed about and along the same, means for rotating the core about its axis at a speed sufficient to effect the radial extension of the whip lashes by centrifugal force, the lengths of the whip lashes being such as to effect the engagement of tips of the extended lashes with appendages of said plants for flicking-off the same, the material of the whip lashes having a hardness of between 48 and 58 units measured by a Shore durometer.

JONATHAN GARST.